Figure 1:
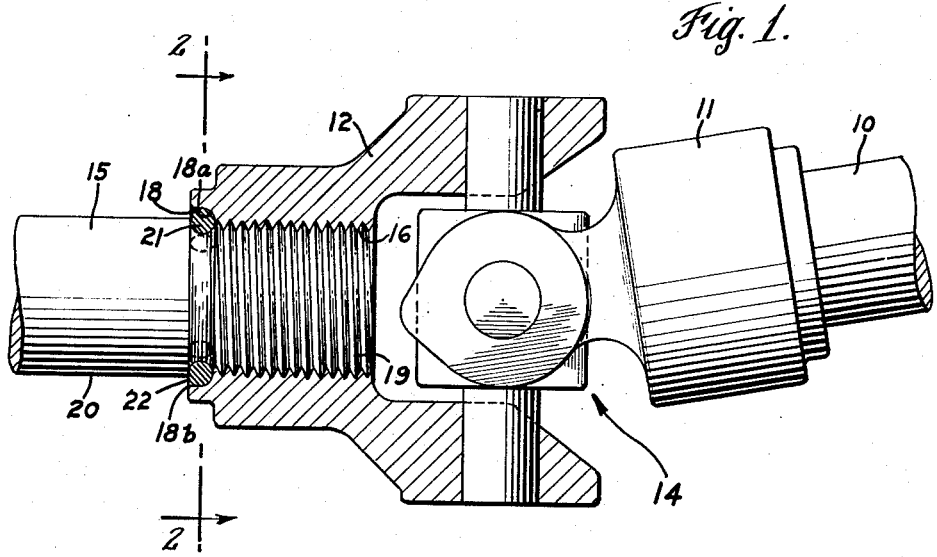

Oct. 25, 1960 R. K. BERKY 2,957,715
THREADED DRIVE YOKE
Filed Jan. 9, 1957

INVENTOR
RICHARD K. BERKY
BY Joseph Allen Brown
ATTORNEY 2,957,715
Patented Oct. 25, 1960

2,957,715
THREADED DRIVE YOKE

Richard K. Berky, Burlington, Iowa, assignor to Sperry Rand Corporation, New Holland, Pa., a corporation of Delaware Filed Jan. 9, 1957, Ser. No. 633,301

3 Claims. (Cl. 287—117)

The present invention relates to an improved joint between a female threaded drive yoke and a driven male shaft in a universal linkage, where the respective parts are subjected to torque forces.

It is conventional in universal linkages in power-take-off drives between, for example, a tractor and a farm implement, to provide a driven shaft having a body of one diameter and a threaded neck of substantially reduced diameter. This reduced neck forms an axially presented shoulder on the shaft. A drive yoke is threaded onto the neck, the yoke having an axially presented face engageable with said axial shoulder, whereby when the parts are threaded tightly together, the abutting face and shoulder serve to lock the respective parts against relative rotation.

Difficulty has been experienced heretofore with such a connection. The entire driving torque forces of the power-take-off are transmitted through the threaded connection. Due to the fact that the threaded end of the drive shaft is of reduced diameter, it is less able to withstand these forces.

The main object of this invention is to provide an improved joint between male and female parts subjected to torque forces, one part transmitting force to the other part.

Another object of this invention is to provide a joint of the character described which has much greater strength than similar joints of prior design.

A further object of this invention is to provide a joint of the character described which is inexpensive to manufacture.

Other objects of this invention will be apparent hereinafter from the specification, and from the recital in the appended claims.

Figure 2:
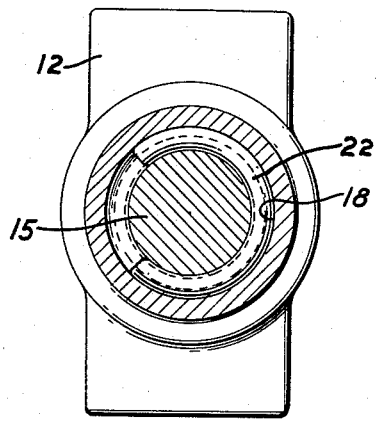

In the drawing:

Fig. 1 is a fragmentary part side elevation, part section of a universal linkage including improved connecting means constructed according to this invention; and, Fig. 2 is a section taken on the line 2—2 of Fig. 1 and looking in the direction of the arrows.

Referring now to the drawing, 10 denotes a driven shaft connected at one end, not shown, to a source of power for rotating the shaft, such as the power-take-off spline of a tractor. Mounted on the other end of shaft 10 is a driven yoke 11 which transmits torque to a similar yoke 12 through a conventional spider-bearing 14, such spider-bearing providing a universal connection between the parts. Yoke 12 is carried on a driven shaft 15 which extends to the device to be operated, such as a farm implement.

The yokes are similarly mounted on their respective shafts. However, only the details of the mounting of yoke 12 is shown.

Yoke 12 constitutes the female member and shaft 15 the male member in the connection. The yoke has a threaded bore 16 and a non-threaded counter-bore 18. Shaft 15 has a threaded neck 19, which is received in bore 16, and a cylindrical body portion 20 outside bore 16. Between the body 20 and neck 19 is an annular recess 21 in which a snap ring 22 is mounted. Snap ring 22 projects radially from the recess, and beyond the periphery of the body portion 20 of the shaft 15.

It will be observed from Fig. 1 that threaded neck 19 of shaft 15 has a diameter substantially the same as the diameter of the body 20 of the shaft. Recess 21 is arcuate; and, snap ring 22 is circular in cross-section. The root diameter of the thread on neck 19 is greater than the inside diameter of the snap ring.

Further, counter-bore 18 provides an axially presented face 18a and a radially presented face 18b which abut against one side and the periphery, respectively, of snap ring 22.

With the above structure, the necessity for a large shoulder on shaft 15 against which yoke 12 can seat is obviated. Without increasing the diameter of the body 20 of shaft 15, a greater diameter threaded neck 19 is provided than was heretofore possible. The large diameter neck in relation to the diameter of the body of the driven shaft provides increased strength. Ring 22 is seated deeply in recess 21. When the yoke 12 is threaded down tightly, its forces are directed through ring 22 to shaft 15. The joint between the yoke and shaft is rugged and there is no danger of the snap ring slipping out, the ring being confined in the recess by the face 18b provided by the non-threaded counter-bore 18.

While this invention has been described in connection with a particular embodiment thereof, it will be understood that it is capable of further modification, and this application is intended to cover any variations, uses, or adaptations, of the invention, following, in general, the principles of the invention and including such departures from the present disclosure as come within known or customary practice in the art to which the invention pertains, and as fall within the scope of the invention or the limits of the appended claims.

Having thus described my invention, what I claim is:

1. A joint between two parts, one of which transmits torque forces to the other, comprising a male member having a body, a threaded neck, and an annular groove between said body and neck, said body and neck having substantially the same outside diameter, a female member having a threaded bore into which said neck is threaded, a snap ring in said annular groove and projecting radially therefrom for engagement with one axial end of said female member, said snap ring being relatively rigid in an axial direction, said female member being counter-bored to provide an axial shoulder engageable with one side of said snap ring and a radial shoulder engageable with the periphery of the ring, and the depth of said counterbore being such that said snap ring is disposed wholly within said female member.

2. A joint between two parts, one of which transmits torque forces to the other, comprising an elongate cylindrical shaft, said shaft having an annular groove formed therein and spaced axially from one end thereof, said shaft being threaded from said annular groove to said one end, the diameter of said shaft being substantially the same on each side of said groove, a snap ring seated in said annular groove and having an outside diameter greater than the diameter of said shaft whereby the ring projects radially from the groove, a female member threaded on said one end of said shaft, and means on said female member engageable with radial and axial portions of said snap ring and holding the snap ring in said groove.

3. A joint as recited in claim 2 wherein the root diameter of the thread on said shaft is greater than the inside diameter of said snap ring.

References Cited in the file of this patent

UNITED STATES PATENTS

| | | |
|---|---|---|
| 478,811 | Oehring | July 12, 1892 |
| 521,695 | Armstrong | June 19, 1894 |
| 686,027 | Carpenter | Nov. 5, 1901 |
| 687,676 | Culver | Nov. 26, 1901 |
| 1,101,008 | Burke | June 23, 1914 |
| 1,127,022 | Knight | Feb. 2, 1915 |
| 2,016,042 | Lewis | Oct. 1, 1935 |
| 2,225,128 | Osborn | Dec. 17, 1940 |
| 2,877,681 | Brown | Mar. 17, 1959 |